(12) United States Patent
Ninomiya et al.

(10) Patent No.: US 7,038,861 B2
(45) Date of Patent: May 2, 2006

(54) IMAGE PICK-UP LENS

(75) Inventors: Noboru Ninomiya, Ome (JP); Naohisa Yamaguchi, Hara-mura (JP); Eiki Matsuo, Suwa (JP)

(73) Assignee: Seiko Epson Corporation (JP)

( * ) Notice: Subject to any disclaimer, the term of this patent is extended or adjusted under 35 U.S.C. 154(b) by 303 days.

(21) Appl. No.: 10/435,509

(22) Filed: May 9, 2003

(65) Prior Publication Data

US 2004/0036983 A1 Feb. 26, 2004

(30) Foreign Application Priority Data

May 10, 2002 (JP) .................................... 2002-136254

(51) Int. Cl.
*G02B 13/18* (2006.01)

(52) U.S. Cl. .................. 359/719; 359/717; 359/718; 359/796

(58) Field of Classification Search ......... 359/793–795, 359/739, 740, 754–756, 708, 713–717, 719, 359/718, 796

See application file for complete search history.

(56) References Cited

U.S. PATENT DOCUMENTS

| | | | | |
|---|---|---|---|---|
| 5,604,639 A | * | 2/1997 | Bietry et al. ................ | 359/717 |
| 5,739,965 A | * | 4/1998 | Ohno ........................ | 359/753 |
| 5,917,661 A | * | 6/1999 | Tochigi et al. ............. | 359/717 |
| 6,744,570 B1 | | 6/2004 | Isono ........................ | 359/772 |
| 2003/0117723 A1 | | 6/2003 | Shinohara .................. | 359/794 |
| 2003/0197953 A1 | | 10/2003 | Yamaguchi et al. ........ | 359/717 |

FOREIGN PATENT DOCUMENTS

| | | |
|---|---|---|
| JP | 01-245211 | 9/1989 |
| JP | 04-211214 | 8/1992 |
| JP | 2003-075719 | 3/2003 |
| JP | 2003-227999 | 8/2003 |
| JP | 2004-004742 | 1/2004 |

* cited by examiner

*Primary Examiner*—Georgia Epps
*Assistant Examiner*—M. Hasan
(74) *Attorney, Agent, or Firm*—Harness, Dickey & Pierce, P.L.C.

(57) ABSTRACT

A low-cost bright image-pick up lens of a small size is provided which is short in total length, wherein the angle of field is beyond 30°; the angle of incidence onto the image pickup device is narrowed; and various aberrations are appropriately corrected. The image-pick up lens comprises, from the side of an object, an aperture stop, a biconvex positive lens, and a meniscus lens having a concave surface on the object side, and each of the lenses includes at least one aspheric surface.

2 Claims, 12 Drawing Sheets

IMAGE PICK-UP LENS

BACKGROUND OF THE INVENTION

1. Technical Field of the Invention

The present invention relates to an image-pick up lens, which forms an image of an object onto an image-receiving surface.

2. Related Art

In recent years, camera modules for taking photos have begun to be incorporated in mobile terminals including mobile phones. Downsizing the camera modules is a prerequisite for these apparatuses in order to enhance their portability. In the meantime, regarding an image pickup device such as CCD and CMOS, a pixel having the size of approximately a few μm has become feasible, and an image pickup device with high-resolution and compact size can be realized. Thus, there is high demand for cost reduction as well as downsizing of an image-pick up optical system to be incorporated to such image pickup device. An optical system is expected to satisfy all requirements of compactness, low cost, high resolution and excellent optical performance, which could conflict with each other.

More specific requirements expected of the optical system may roughly be classified as follows:

Low cost (the system including as few lenses as possible; enabled to be formed of resin; and easily assembled)

Brightness (small Fno)

Compactness (particularly, the length from the lens edge to the image pickup device being short)

Wide angle of field (desirably, 30° or more)

Uniform illumination on an image surface (few eclipses/narrowing down the angle of incidence onto an image pickup device)

High resolution (appropriately corrected fundamental aberrations such as spherical aberration, coma aberration, curvature of field, astigmatism, distortion, and chromatic aberration)

If an optical system satisfying all the above requirements can be formed with few lenses, the range of applying the system will be broadened. Many kinds of lenses have been proposed so far; however, it has been very difficult to satisfy all the requirements by using only two lenses.

As for the two-lens structure, arranging "a negative lens and a positive lens" from the side of an object is advantageous in correcting aberrations, but the arrangement limits the size reduction. In order to shorten the overall length of the two-lens structure, it is desirable to arrange a pair of "a positive lens and a positive lens" or a pair of "a positive lens and a negative lens". Moreover, in order to narrow down the angle of incidence onto the image pickup device, it is desirable to employ a 'front-set stop' type, which has an aperture stop at the side closest to the object. Among structures having been proposed so far, Japanese patent unexamined application laid open No. 01-245211 and No. 04-211214 disclose structures satisfying the above requirements.

FIG. 22 shows a sectional view of the disclosure in the unexamined patent application laid open No. 01-245211. The structure is composed of a first biconvex positive lens and a second negative meniscus lens having a concave surface on the image side. In this example, the second lens exhibits relatively stronger power and has a concave surface on the side of an object, so that the angle of incidence onto the image pickup device is likely to be wide. Consequently, it is difficult to enlarge the angle of field, and the angle of field of the example is approximately 20°, which is a relatively small value.

FIG. 23 shows a sectional view of the disclosure in the unexamined patent application laid open No. 04-211214. The structure is composed of an image-pick up lens 10 on the side of an object and a correction lens 20 on the side of an image. In this example, the image-pick up lens 10 on the side of the object takes charge of almost all systems power, and the both surfaces of the correction lens 20 on the side of the image are aspheric. Consequently, field aberration is corrected so as to maintain balance among aberrations that occur when enlarging the angle of field. In this configuration, the lens 10 on the object side is, in charge of the fundamental imaging function. Therefore, when the lens on the object side is configured with a single lens, there is a limit in taking balance of field aberrations only by using the correction lens 20 while narrowing down the angle of incidence onto an image pickup device. Moreover, it is also difficult to correct chromatic aberration effectively, and thus widening the angle is limited.

The present invention provides a low-cost bright image-pick up lens system of a small size which is short in the total length, wherein angle of field is beyond 30°; the angle of incidence onto an image pickup device can be narrowed down; and various aberrations are appropriately corrected.

SUMMARY

In order to achieve the above goal, the present invention employs the following configurations. First, according to a first aspect, an image-pick up lens of the present invention comprises, from the side of an object, an aperture stop, a biconvex positive lens and a meniscus lens having a concave surface on the object side. Furthermore, when each lens includes at least one aspheric surface, and 'f' indicates the focal length of all systems, 'f1' indicates the focal length of the positive lens, and 'T' indicates the length from the aperture stop to an image-pick up surface, the following conditions are satisfied:

$$3 < f1/f < 0.9$$

$$T/f < 2.4$$

According to a second aspect, when both surfaces of at least one of the positive lens and the meniscus lens are aspheric, and regarding the curvature radius of each lens, 'R' indicates the curvature radius of the positive lens on the object side, 'R2' indicates that of the positive lens on the image side, and 'R3' indicates that of the meniscus lens on the object side, the image-pick up lens of the present invention satisfies the following conditions:

$$0 < R2/R1 < 0.5$$

$$0.4 < R3/R2 < 1.0$$

According to a third aspect, when 'u1' stands for dispersion of the positive lens, and 'u2' for dispersion of the meniscus lens, the image-pick up lens of the present invention satisfies the following conditions:

$$u1 > 50$$

$$u2 < 40$$

According to a fourth aspect, regarding the image-pick up lens of the present invention, at least one of the positive lens and the meniscus lens is formed of resin material.

According to a fifth aspect, regarding the image-pick up lens of the present invention, the positive lens and the meniscus lens are joined to each other with a fitting portion which is formed integrally on an external diameter of at least one of the lenses.

According to a sixth aspect, regarding the image-pick up lens of the present invention, the meniscus lens also functions as a cover for an image pickup device provided on an image side thereof.

With the above configurations, a targeted image-pick up lens can be provided.

DETAILED DESCRIPTION

An embodiment of the present invention will be explained based on particular examples of configurations.

Figure 1:
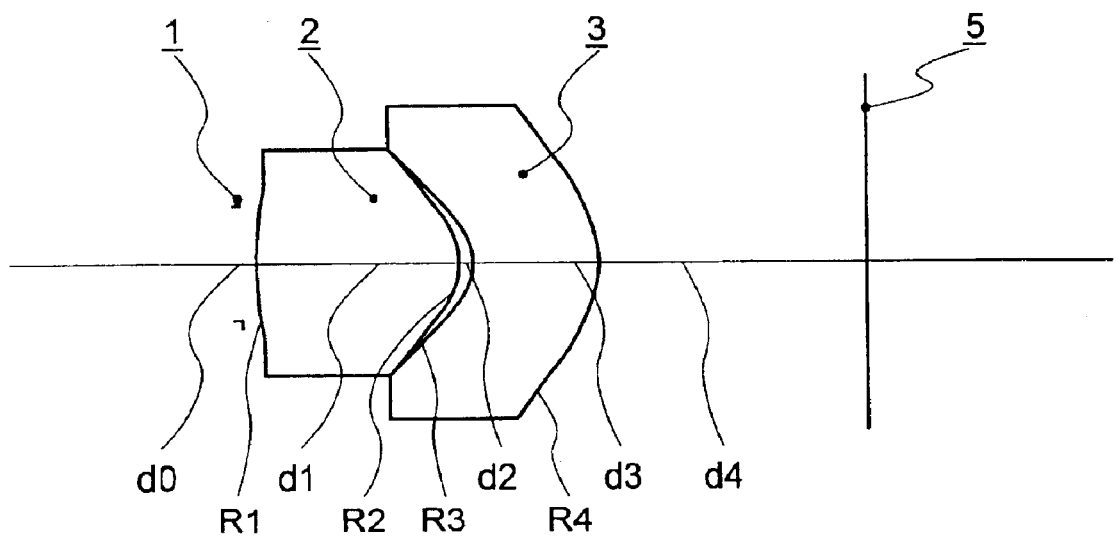
FIG. 1 is a sectional view of an embodiment of the image-pick up lens.
Figure 2:
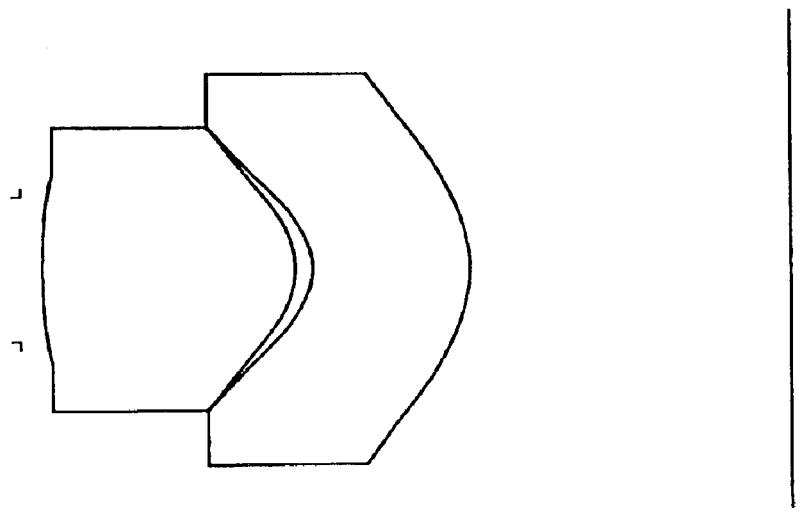
FIG. 2 shows an optical section of the Example 1.
Figure 3:
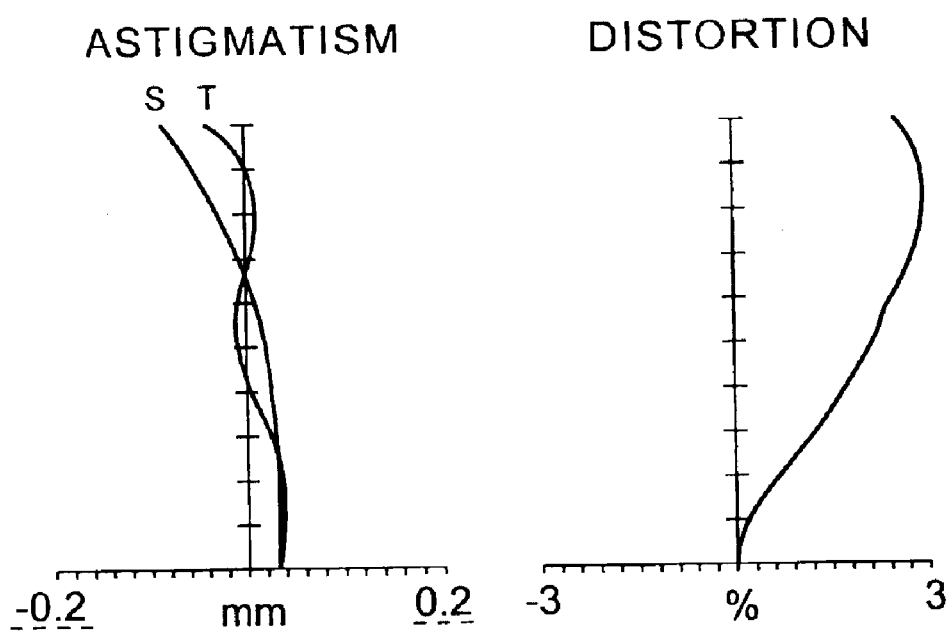
FIG. 3 shows field aberrations of the Example 1.
Figure 4:
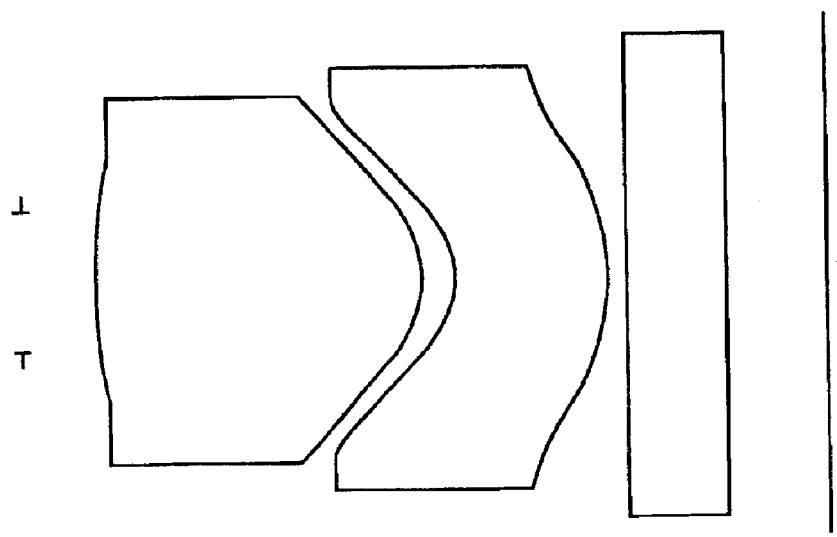
FIG. 4 shows an optical section of the Example 2.
Figure 5:
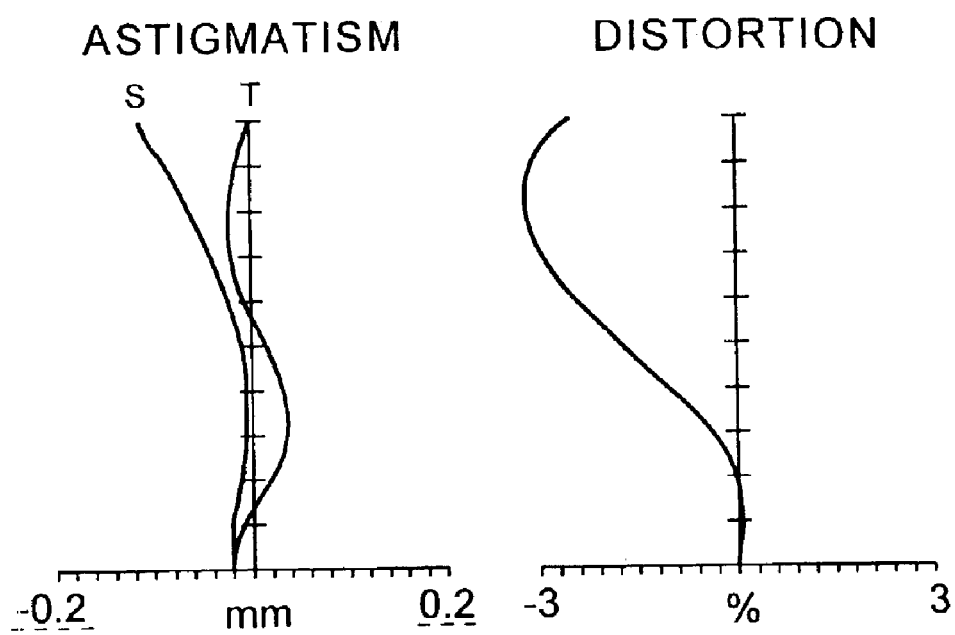
FIG. 5 shows field aberrations of the Example 2.
Figure 6:
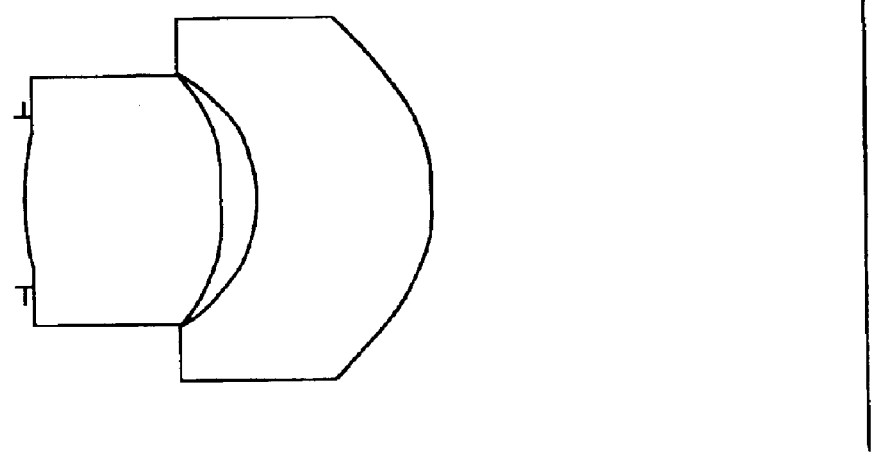
FIG. 6 shows an optical section of the Example 3.
Figure 7:
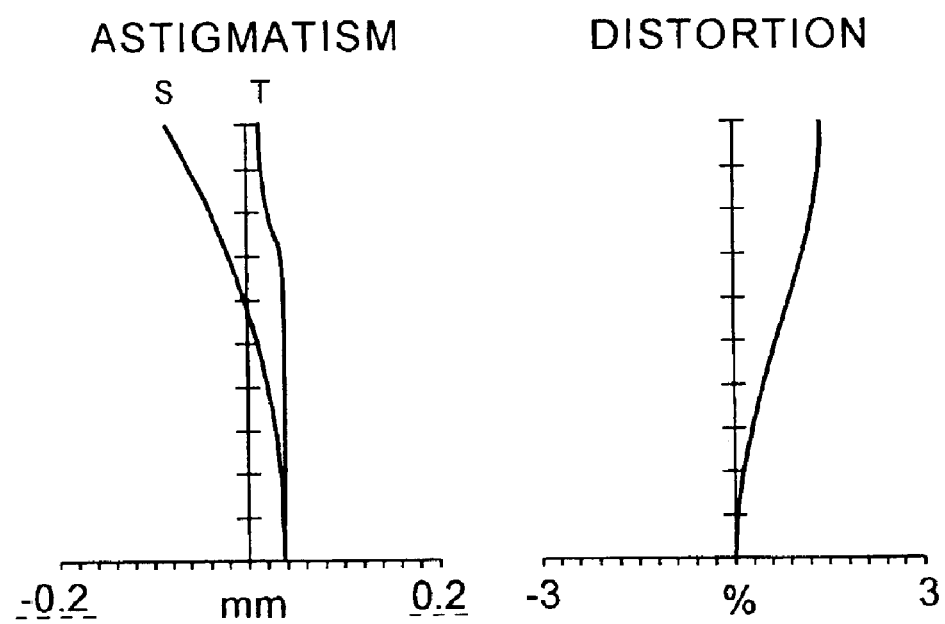
FIG. 7 shows field aberrations of the Example 3.
Figure 8:
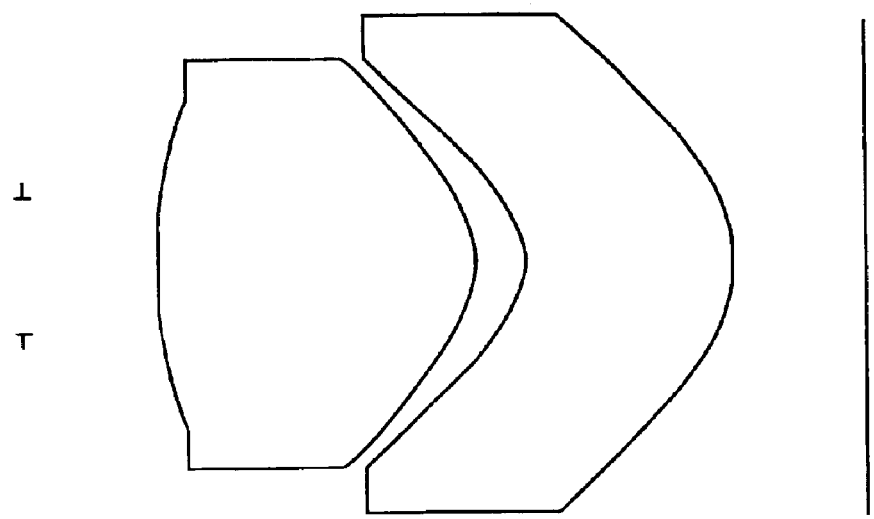
FIG. 8 shows an optical section of the Example 4.
Figure 9:
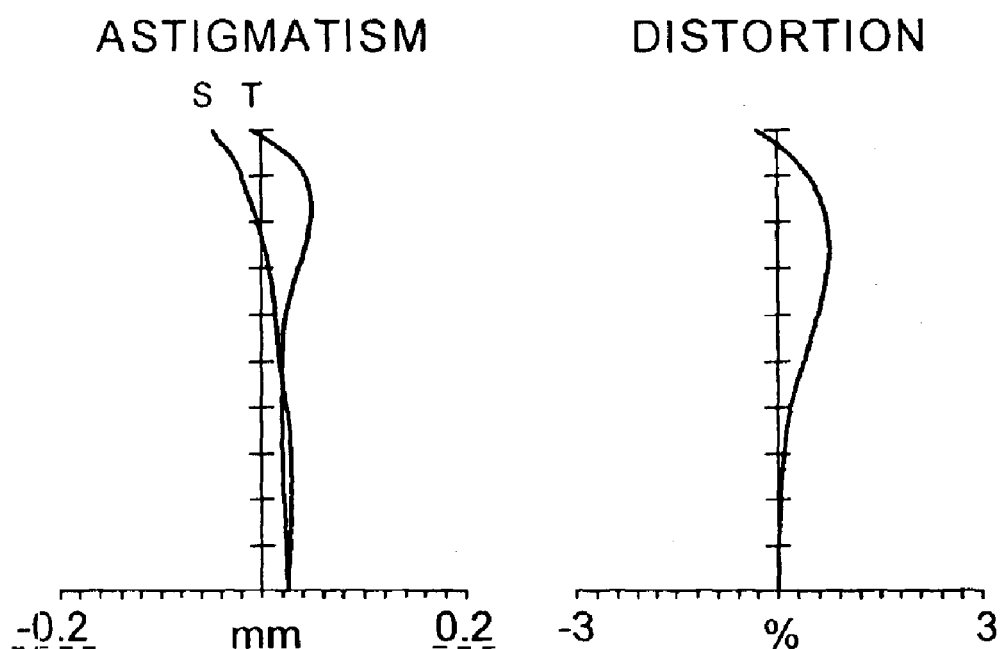
FIG. 9 shows field aberrations of the Example 4.
Figure 10:
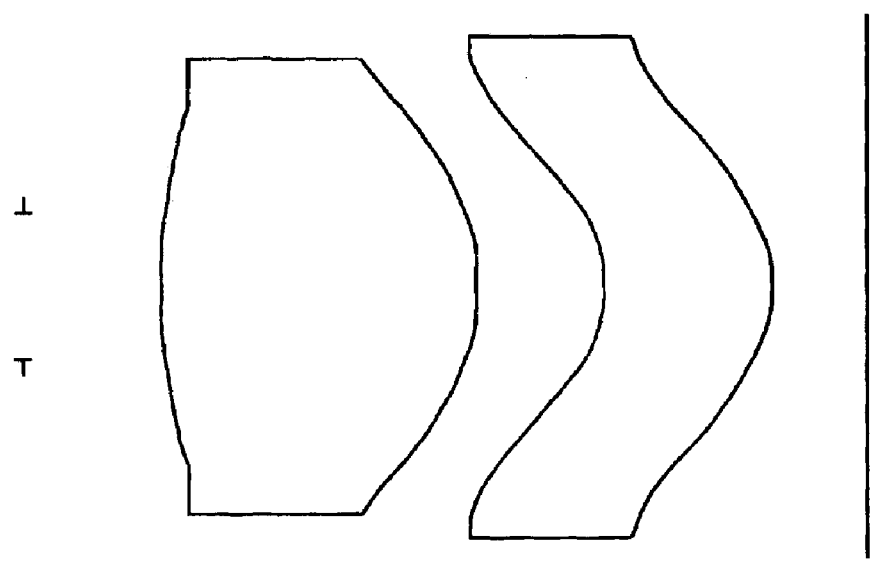
FIG. 10 shows an optical section of the Example 5.
Figure 11:
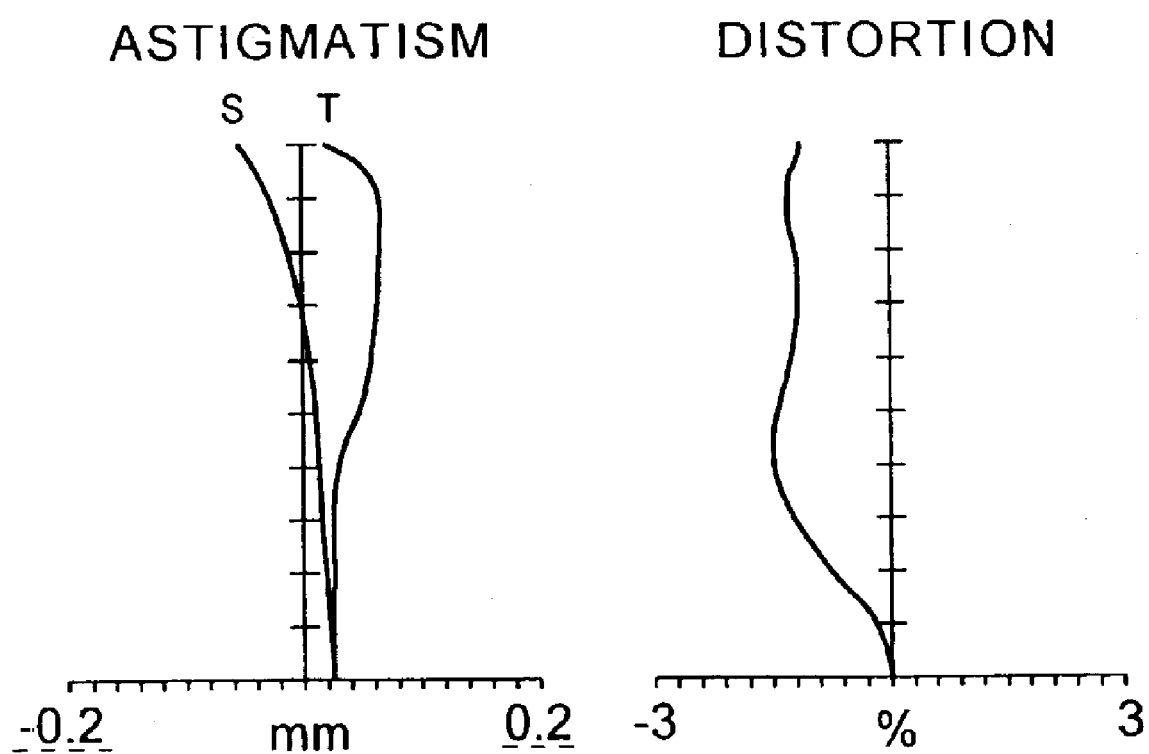
FIG. 11 shows field aberrations of the Example 5.
Figure 12:
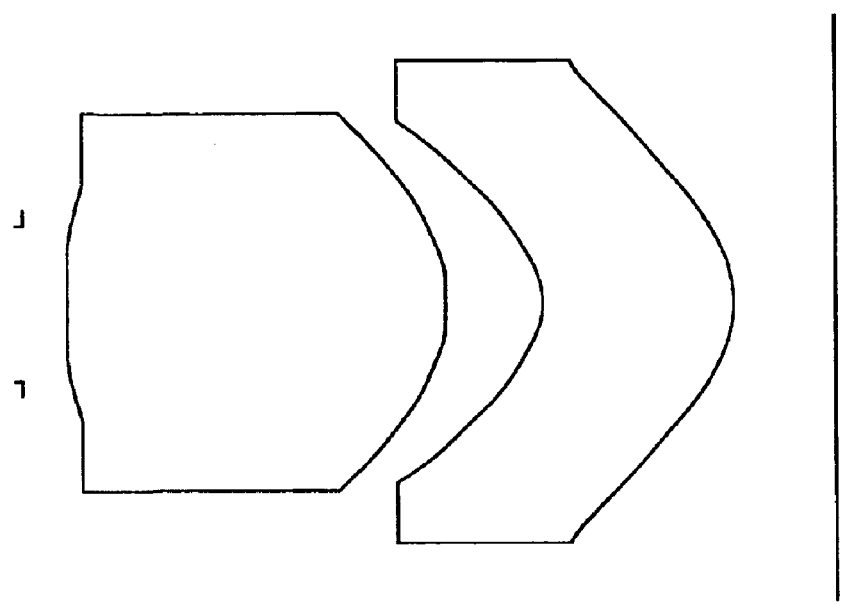
FIG. 12 shows an optical section of the Example 6.
Figure 13:
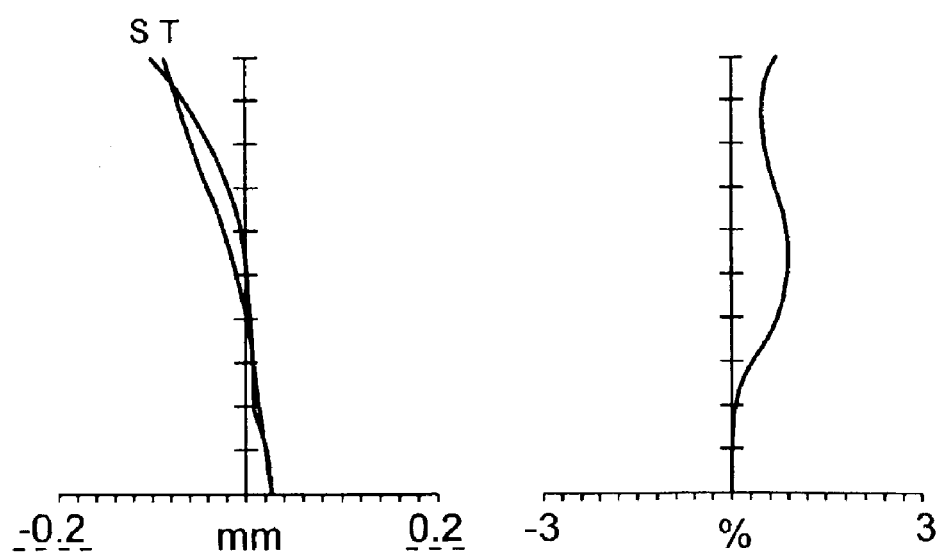
FIG. 13 shows field aberrations of the Example 6.
Figure 14:
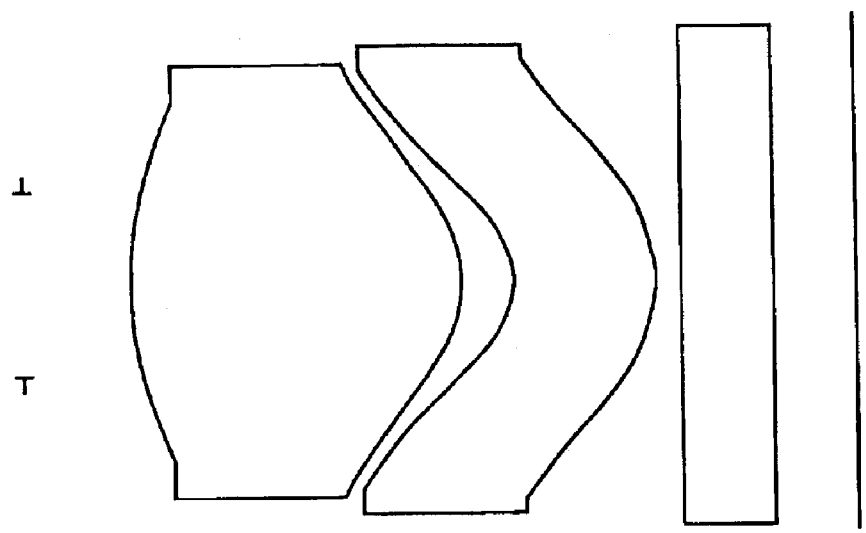
FIG. 14 shows an optical section of the Example 7.
Figure 15:
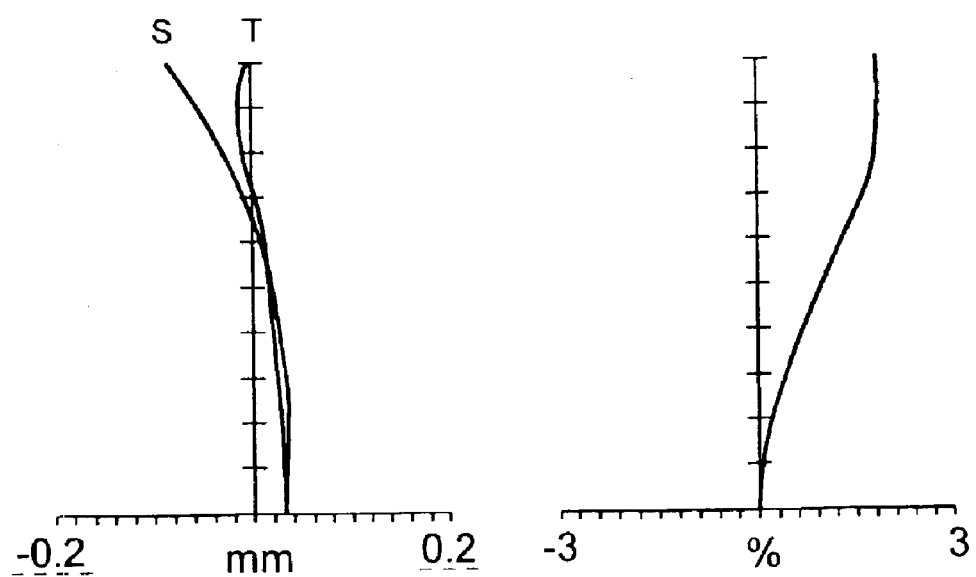
FIG. 15 shows field aberrations of the Example 7.
Figure 16:
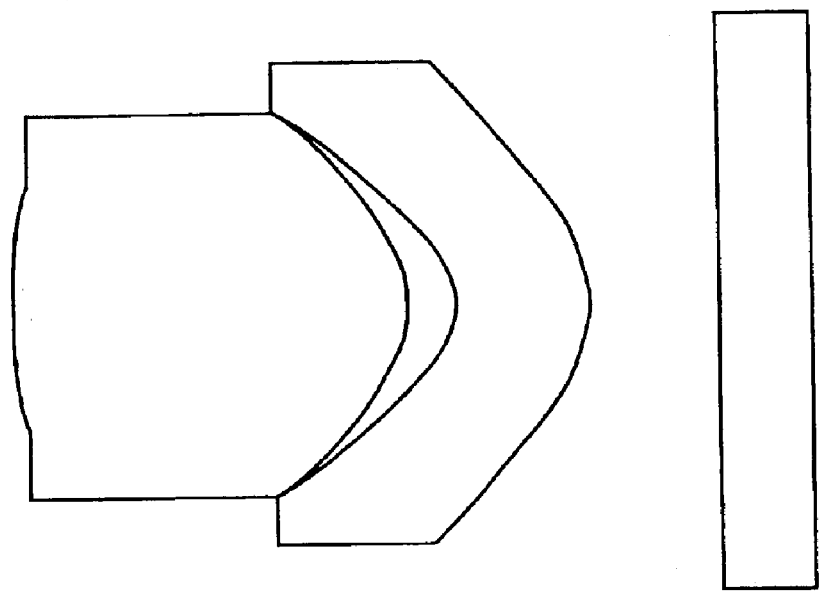
FIG. 16 shows an optical section of the Example 8.
Figure 17:
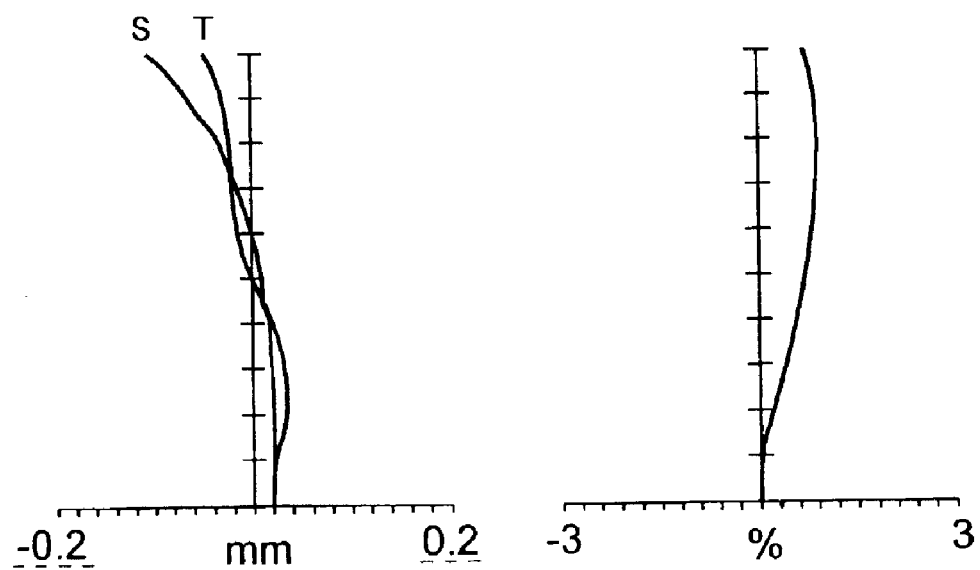
FIG. 17 shows field aberrations of the Example 8.
Figure 18:
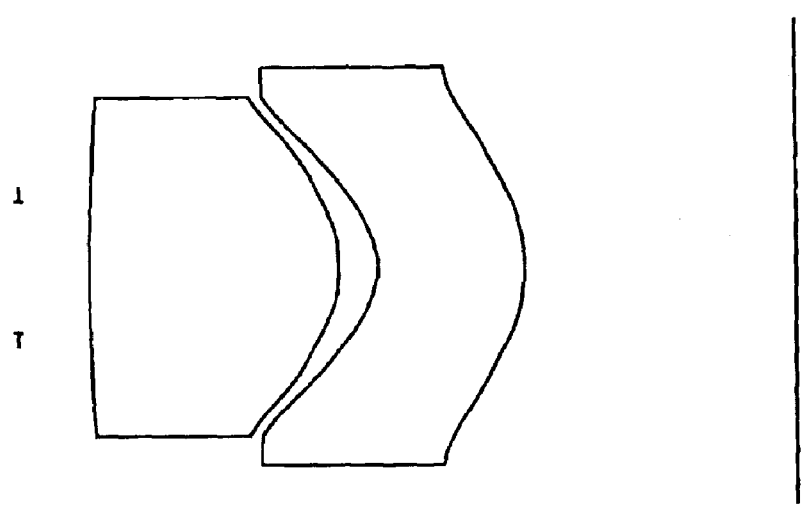
FIG. 18 shows an optical section of the Example 9.
Figure 19:
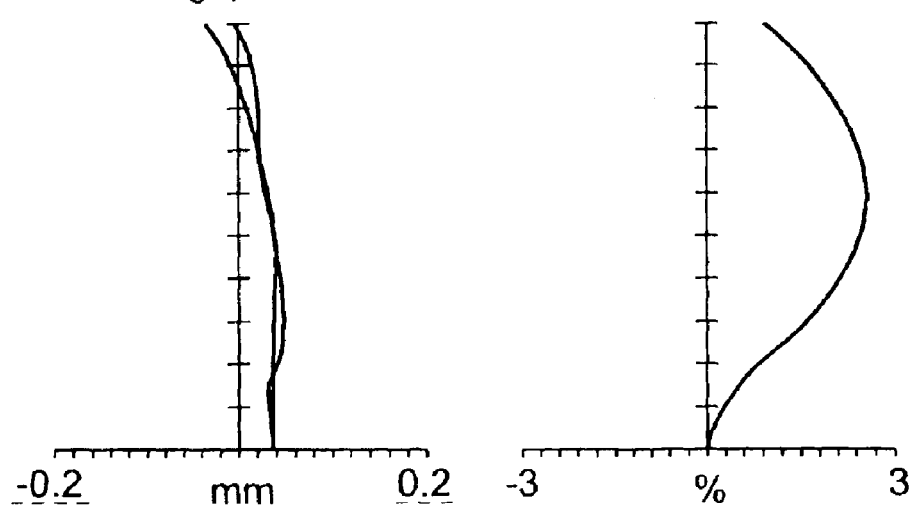
FIG. 19 shows field aberrations of the Example 9.
Figure 20:
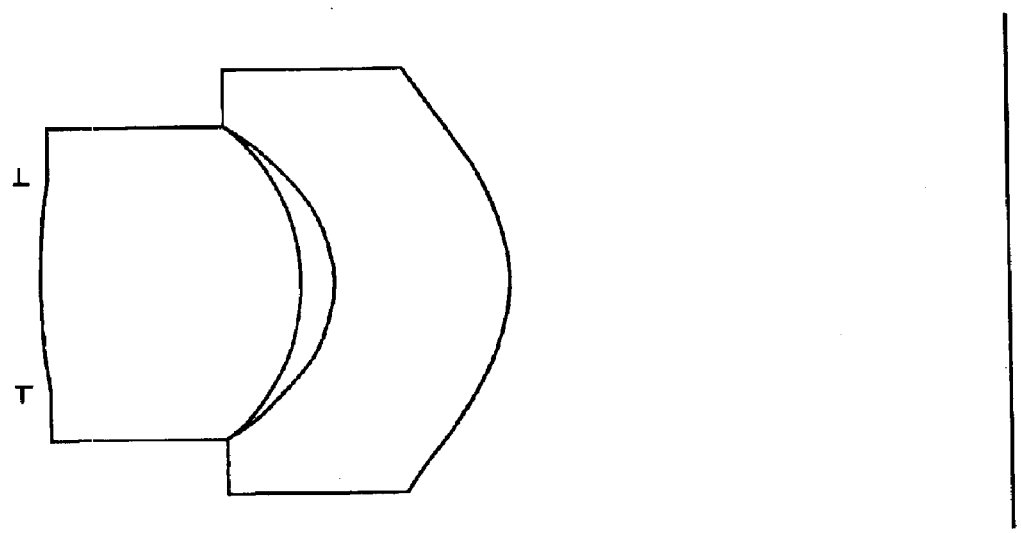
FIG. 20 shows an optical section of the Example 10.
Figure 21:
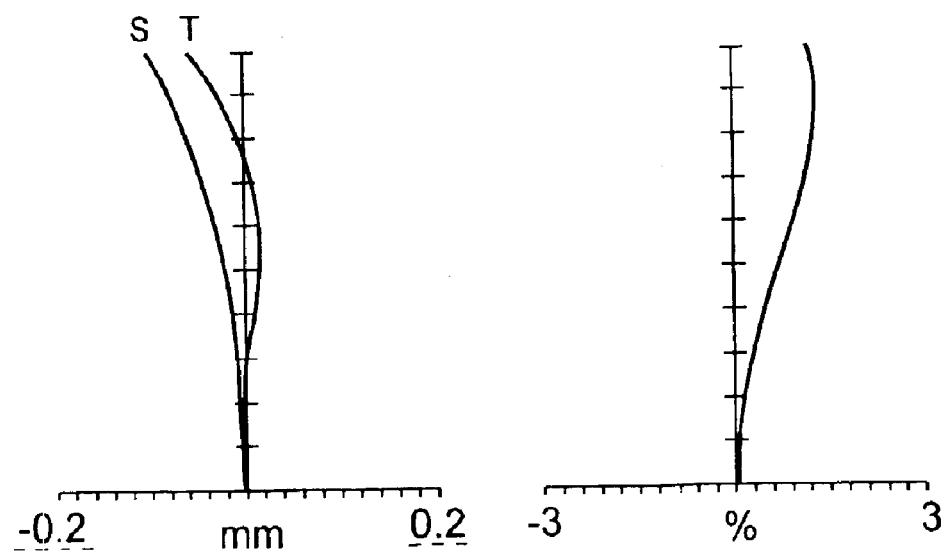
FIG. 21 shows field aberrations of the Example 10.
Figure 22:
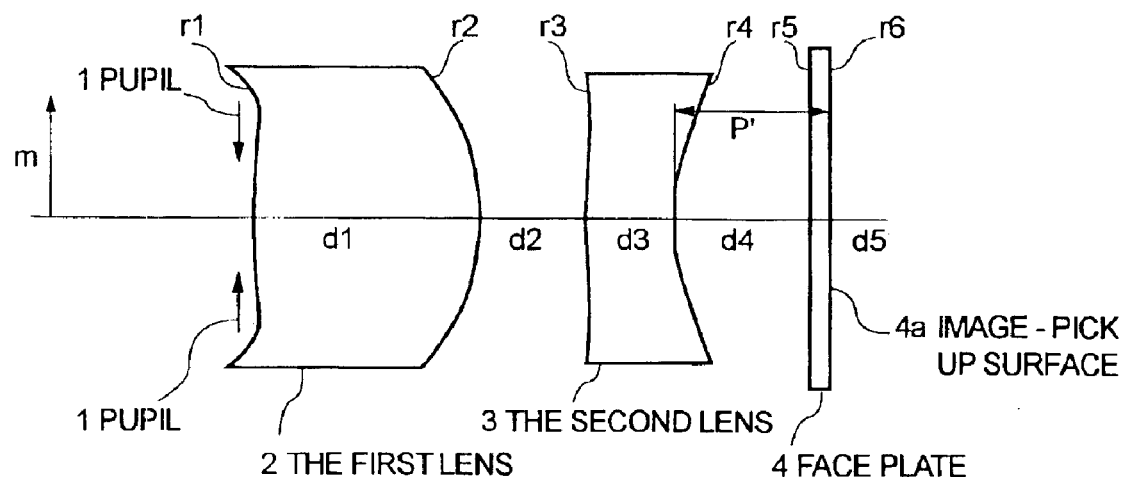
FIG. 22 is a sectional view of the disclosure in the unexamined patent application laid open No. 01-245211.
Figure 23:
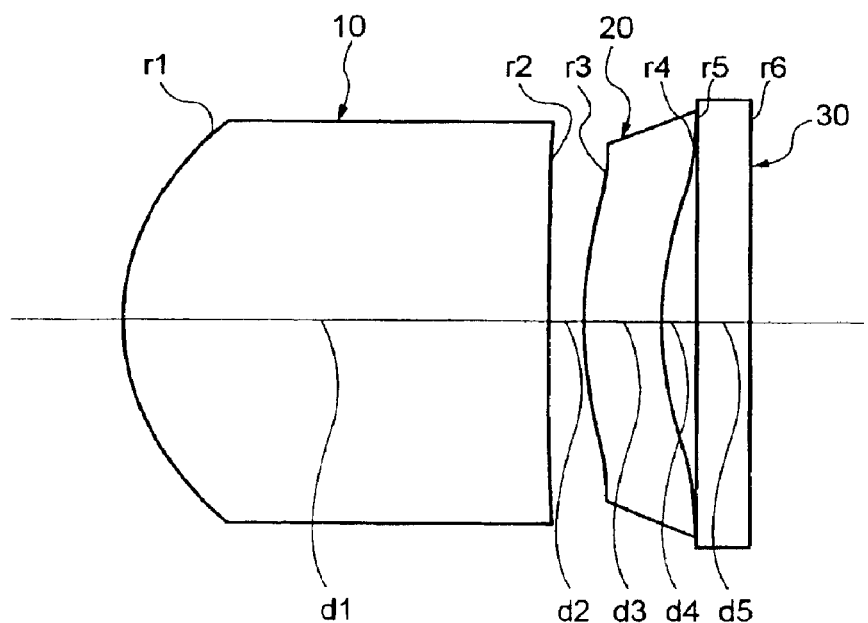
FIG. 23 is a sectional view of the disclosure in the unexamined patent application laid open No. 04-211214.

FIG. 1 is a sectional view of an image-pick up lens of the present invention. Light beams incident from the side of an object sequentially pass through an aperture stop 1 at the side closest to the object, a biconvex positive lens 2, and a meniscus lens 3 having a concave surface on the object side so as to be converged on a light receiving surface of an image pickup device 5. Usually, a cover glass is provided between the meniscus lens 3 and the image pickup device 5.

First, arranging the aperture stop 1 at the side closest to the object is a condition for narrowing down the angle of incidence onto the image pickup device 5. Moreover, in order to shorten the total length of the lenses, it is a basic requirement for the biconvex lens 2 on the object side to satisfy:

$$0.3 < f1/f < 0.9$$

The surfaces of the lenses are aspheric appropriately, which is a prerequisite for satisfying many of the required conditions by using the small number of lenses.

In addition, the biconvex lens 2 on the object side preferably satisfies a condition:

$$0 < R2/R1 < 0.5$$

This condition is for narrowing down the angle of incidence onto the image pickup device 5 along with the condition of the front-set stop. When a value of the condition is below the lower limit, 'R2' becomes relatively small, so that various aberrations generated at the surface become too appreciable to be corrected with ease. On the other hand, when a value of the condition is more than the upper limit, 'R2' increases, and the power at the biconvex lens 2 on the image side becomes small. Consequently, it is necessary to place the aperture stop 1 further away in order to narrow down the angle of incidence onto the image pickup device 5. Accordingly, field aberrations due to the biconvex lens 2 get too appreciable to be corrected with ease. Moreover, the total length 'T' including the aperture stop 1 is long.

Regarding the meniscus lens 3 having a concave surface on the object side of the image side, the paraxial focal length can be negative or positive;, however, it is, desirable: to satisfy the following condition:

$$b \; 0.4 < R3/R2 < 1.0$$

This condition is for keeping the aberrations in satisfactory conditions along with the above condition regarding 'R1' and 'R2'. If a value of the condition is beyond the upper limit and/or below the lower limit, balance with 'R2' having relatively strong power collapses. Consequently, it is difficult to keep the aberrations of image height in satisfactory conditions.

Also, in order to appropriately correct a chromatic aberration, dispersion 'u1' of the biconvex lens 1 and dispersion 'u2' of the meniscus lens preferably satisfy the following conditions:

$$u1 > 50$$

$$u2 < 40$$

The fundamental constituent elements of the present invention are as explained above. Next, attendant circumstances for providing a low-cost image-pick up lens of a small size are explained. First, it is preferable to employ resin as the material for the lenses in order to improve efficiency in assembling while reducing as much cost and many members used as possible. Various ideas have been presented as to the integration of the image pickup device 5 and the optical system in particular. However, there are few specific suggestions including those for the lens structure, and implementation is difficult in many cases.

In the present invention, the primary structure is an arrangement of "a positive lens and a positive lens" or of "a positive lens and a negative lens". Accordingly, the meniscus lens 3 and the image pickup device 5 are closely located and can easily be integrated. Moreover, when a structure is added for fitting a convex lens to the external diameter of the meniscus lens 3 on the object side, the meniscus lens 3 having a concave surface on the object side can incorporate the fitting structure as a lens-shaped natural extension thereof. Therefore, the performance is hardly affected. Also, directly fitting lenses to each other is greatly advantageous in that it is possible to maintain precision in respect of de-centering or center deviation and spacing.

Also, it is cost effective to employ the meniscus lens 3 close to the image pickup device 5 as the cover glass for the image pickup device 5. In that case, the image-pick up lens does not comprise the above-mentioned integral structure from the beginning, and only the meniscus lens 3 is mounted as a substitute for the cover glass, and the biconvex lens 1 can be fitted in a later process.

EXAMPLE

The following illustrates an example of the present invention with specific numerical values.

TABLE 1

Lens Constituent Parameter

|   |    | Curvature Radius | Space |       | Refraction |    | Dispersion |
|---|----|------------------|-------|-------|------------|----|------------|
|   |    | Example 1        |       |       |            |    |            |
|   |    |                  | d0    | 0.130 |            |    |            |
| 1 | R1 | 2.511            | d1    | 1.282 | n1         | 1.492 | u1 | 57.4 |
| 2 | R2 | −0.336           | d2    | 0.091 | n2         | 1.000 | u2 |      |
| 3 | R3 | −0.260           | d3    | 0.806 | n3         | 1.585 | u3 | 29.9 |
| 4 | R4 | −0.702           | d4    | 1.585 | n4         | 1.000 | u4 |      |
|   |    | Example 2        |       |       |            |    |            |
|   |    |                  | d0    | 0.358 |            |    |            |
| 1 | R1 | 1.984            | d1    | 1.630 | n1         | 1.492 | u1 | 57.4 |
| 2 | R2 | −0.486           | d2    | 0.176 | n2         | 1.000 | u2 |      |
| 3 | R3 | −0.379           | d3    | 0.750 | n3         | 1.492 | u3 | 57.4 |
| 4 | R4 | −1.017           | d4    | 0.091 | n4         | 1.000 | u4 |      |
| 5 | R5 |                  | d5    | 0.500 | n5         | 1.492 | u5 | 57.4 |
| 6 | R6 |                  | d6    | 0.500 | n6         | 1.000 | u6 |      |
|   |    | Example 3        |       |       |            |    |            |
|   |    |                  | d0    |       |            |    |            |
| 1 | R1 | 3.421            | d1    | 1.051 | n1         | 1.492 | u1 | 57.4 |
| 2 | R2 | −1.512           | d2    | 0.186 | n2         | 1.000 | u2 |      |
| 3 | R3 | −0.753           | d3    | 0.955 | n3         | 1.492 | u3 | 57.4 |
| 4 | R4 | −0.914           | d4    | 2.308 | n4         | 1.000 | u4 |      |
|   |    | Example 4        |       |       |            |    |            |
|   |    |                  | d0    | 0.714 |            |    |            |
| 1 | R1 | 2.053            | d1    | 1.707 | n1         | 1.492 | u1 | 57.4 |
| 2 | R2 | −0.553           | d2    | 0.274 | n2         | 1.000 | u2 |      |
| 3 | R3 | −0.408           | d3    | 1.100 | n3         | 1.585 | u3 | 29.9 |
| 4 | R4 | −0.704           | d4    | 0.705 | n4         | 1.000 | u4 |      |

TABLE 1-continued

Lens Constituent Parameter

|   |    | Curvature Radius | Space |       | Refraction |    | Dispersion |
|---|----|------------------|-------|-------|------------|----|------------|
|   |    | Example 5        |       |       |            |    |            |
|   |    |                  | d0    | 0.663 |            |    |            |
| 1 | R1 | 2.223            | d1    | 1.506 | n1         | 1.492 | u1 | 57.4 |
| 2 | R2 | −0.843           | d2    | 0.622 | n2         | 1.000 | u2 |      |
| 3 | R3 | −0.496           | d3    | 0.783 | n3         | 1.585 | u3 | 29.9 |
| 4 | R4 | −0.619           | d4    | 0.468 | n4         | 1.000 | u4 |      |

Table 1 is a list showing configurations of the examples 1 through 5. The numbers on the left edge of the table correspond to the respective surfaces of the lenses. 1 indicates the first surface of the biconvex lens 2; 2 indicates the second surface of the lens 2; 3 indicates the first surface of the meniscus lens 3; and 4 indicates the second surface of the lens 3. 5 or 6, if any, indicates the cover glass. Moreover, R stands for curvature radius; d for space; n for refraction; and u for dispersion.

Table 2 is a list showing aspheric coefficients of the same examples 1 through 5. The aspheric surface of the present invention employs the one shown by the first formula for convenience; however, it is not limited to this type.

$$z = \frac{ch^2}{1 + \sqrt{1-(1+k)c^2h^2}} + A_4 h^4 + A_6 h^6 + A_8 h^8 + \cdots + A_{26} h^{26} \qquad \text{Formula 1}$$

Here, 'z' in the formula 1 indicates the depth from the reference surface in the direction of an optical axis passing through the apex of the aspheric surface. Also, 'c' is the inverse number of the curvature radius R of the surface, and 'h' indicates the height from the optical axis of the surface. 'k' is a conic constant, and $A_4$ to $A_{26}$ are correction coefficients of the aspheric surfaces.

TABLE 2

Coefficients of Aspheric Surfaces

|   | Conic Constant | A4 | A6 | A8 | A10 |
|---|---|---|---|---|---|
|   |   | Example 1 |   |   |   |
| 1 | −13.451 |   |   |   |   |
| 2 | −2.040  | 2.35406E−02  | −5.19505E−02 | 1.54612E−01  |   |
| 3 | −1.730  | −1.69190E−02 | 2.18298E−01  | −1.28042E−02 |   |
| 4 | −1.720  | −2.60747E−02 | 6.16902E−02  | −1.56946E−02 |   |
|   |   | Example 2 |   |   |   |
| 1 | −11.619 |   |   |   |   |
| 2 | −2.038  | −3.11096E−01 | 2.33868E−01  | 4.40133E−02  |   |
| 3 | −1.604  | −3.12122E−01 | 7.27748E−01  | −2.42919E−01 |   |
| 4 | −1.592  | −1.00454E−01 | 1.87369E−01  | −2.60557E−02 |   |
| 5 |         |              |              |              |   |
| 6 |         |              |              |              |   |
|   |   | Example 3 |   |   |   |
| 1 | 0.069  | 1.79998E−02  | −1.61635E−01 | 2.43031E−01  |   |
| 2 | 3.430  | 1.96991E−03  | 1.97232E−01  | −5.48315E−01 |   |
| 3 |        |              |              |              |   |
| 4 | −0.962 | −3.65765E−02 | 7.43552E−03  | −4.65821E−02 | 5.35606E−02 |

TABLE 2-continued

Coefficients of Aspheric Surfaces

| | Conic Constant | A4 | A6 | A8 | A10 |
|---|---|---|---|---|---|
| | | | Example 4 | | |
| 1 | −11.361 | 8.67725E−02 | −4.87762E−02 | | |
| 2 | −1.980 | 1.23464E−02 | −1.17956E−02 | −1.13937E−02 | |
| 3 | −1.624 | −1.59901E−02 | 1.75411E−02 | −6.24389E−04 | |
| 4 | −1.397 | 9.98882E−03 | 5.08110E−03 | 3.37427E−03 | |
| | | | Example 5 | | |
| 1 | −10.230 | | | | |
| 2 | −1.795 | −7.56406E−03 | −1.00641E−01 | 7.54959E−02 | |
| 3 | −1.244 | 1.70940E−02 | 2.65075E−01 | −8.58190E−02 | |
| 4 | −1.418 | −3.20681E−02 | 9.94592E−02 | 2.11404E−03 | |

Similarly, table 3 is a list showing constituent parameters of Examples 6 through 10 of the present invention.

TABLE 3

| | | Radius Curvature | Spacing | | Refraction | | Dispersion |
|---|---|---|---|---|---|---|---|
| | | | Example 6 | | | | |
| | | | d0 | 0.213 | | | |
| 1 | R1 | 1.926 | d1 | 1.730 | n1 | 1.492 u1 | 57.4 |
| 2 | R2 | −0.645 | d2 | 0.442 | n2 | 1.000 u2 | |
| 3 | R3 | −0.370 | d3 | 0.862 | n3 | 1.585 u3 | 29.9 |
| 4 | R4 | −0.526 | d4 | 0.445 | n4 | 1.000 u4 | |
| | | | Example 7 | | | | |
| | | | d0 | 0.555 | | | |
| 1 | R1 | 1.878 | d1 | 1.712 | n1 | 1.492 u1 | 57.4 |
| 2 | R2 | −0.598 | d2 | 0.266 | n2 | 1.000 u2 | |
| 3 | R3 | −0.380 | d3 | 0.750 | n3 | 1.585 u3 | 29.9 |
| 4 | R4 | −0.653 | d4 | 0.117 | n4 | 1.000 u4 | |
| 5 | R5 | | d5 | 0.500 | n5 | 1.492 u5 | 57.4 |
| 6 | R6 | | d6 | 0.400 | n6 | u6 | |
| | | | Example 8 | | | | |
| | | | d0 | 0.323 | | | |
| 1 | R1 | 2.658 | d1 | 2.204 | n1 | 1.492 u1 | 57.4 |
| 2 | R2 | −0.720 | d2 | 0.285 | n2 | 1.000 u2 | |
| 3 | R3 | −0.434 | d3 | 0.750 | n3 | 1.585 u3 | 29.9 |
| 4 | R4 | −0.789 | d4 | 0.738 | n4 | 1.000 u4 | |
| 5 | R5 | | d5 | 0.500 | n5 | 1.492 u5 | 57.4 |
| 6 | R6 | | d6 | 0.400 | n6 | u6 | |
| | | | Example 9 | | | | |
| | | | d0 | 0.382 | | | |
| 1 | R1 | 4.705 | d1 | 1.318 | n1 | 1.694 u1 | 53.2 |
| 2 | R2 | −0.754 | d2 | 0.210 | n2 | 1.000 u2 | |
| 3 | R3 | −0.395 | d3 | 0.771 | n3 | 1.585 u3 | 29.9 |
| 4 | R4 | −0.769 | d4 | 1.420 | n4 | 1.000 u4 | |
| | | | Example 10 | | | | |
| | | | d0 | 0.080 | | | |
| 1 | R1 | 2.921 | d1 | 1.204 | n1 | 1.492 u1 | 57.4 |
| 2 | R2 | −0.881 | d2 | 0.150 | n2 | 1.000 u2 | |
| 3 | R3 | −0.542 | d3 | 0.775 | n3 | 1.585 u3 | 29.9 |
| 4 | R4 | −0.899 | d4 | 2.270 | n4 | 1.000 u4 | |

Table 4 is a list showing coefficients of aspheric surfaces corresponding to the Examples 6 through 10 of the table 3.

TABLE 4

| | Conic Constant | A4 | A6 | A8 | A10 |
|---|---|---|---|---|---|
| | | | Example 6 | | |
| 1 | −7.369 | | | | |
| 2 | −1.782 | −1.04658E−02 | −1.03146E−01 | 4.12922E−02 | |
| 3 | −1.382 | 2.42883E−03 | 2.79388E−02 | 5.51694E−02 | |
| 4 | −1.723 | −8.63345E−02 | 6.47178E−02 | 1.41343E−02 | |
| | | | Example 7 | | |
| 1 | −2.701 | | | | |
| 2 | −2.204 | −7.60304E−03 | −7.63954E−02 | 7.36559E−02 | |
| 3 | −1.613 | −9.72389E−02 | 1.91092E−01 | −2.73574E−02 | |
| 4 | −1.388 | 6.03458E−03 | 4.73632E−02 | 6.35925E−03 | |
| 5 | | | | | |
| 6 | | | | | |
| | | | Example 8 | | |
| 1 | | | | | |
| 2 | −4.079 | | | | |
| 3 | −2.328 | −1.72299E−01 | 1.27672E−01 | −6.42517E−02 | |
| 4 | −1.286 | −7.76963E−02 | 1.70223E−01 | −7.17392E−02 | |

TABLE 4-continued

|   | Conic Constant | A4 | A6 | A8 | A10 |
|---|---|---|---|---|---|
| 5 | −1.223 | −3.68424E−02 | 5.54292E−02 | −7.03725E−03 | |
| 6 | | | | | |
| | | | Example 9 | | |
| 1 | | −2.76155E−02 | −2.56448E−01 | | |
| 2 | −2.155 | −1.04159E−01 | −1.54110E−01 | 1.37588E−01 | |
| 3 | −1.580 | 3.60074E−02 | 1.09120E−03 | 1.17720E−01 | |
| 4 | −1.935 | 7.60423E−03 | 1.06919E−01 | −2.55589E−02 | |
| | | | Example 10 | | |
| 1 | −12.554 | −1.97026E−02 | 3.33365E−01 | 1.12935E+00 | |
| 2 | | | | | |
| 3 | −0.846 | −1.58105E−01 | 3.06970E−01 | | |
| 4 | −1.035 | −2.51383E−02 | 5.25718E−02 | 3.68552E−03 | 1.89989E−02 |

In each of the Examples 2, 7 and 8 of the above Examples, the image-pick up lens includes the cover glass on the image side thereof.

Table 5 is a list showing the relationship between focal lengths and parameters regarding the Examples 1 through 10. In the table, the height of principal ray H2 indicates the height of passage of the principal ray corresponding to the maximum angle of field at the surface of the positive lens 2 on the image side. Similarly, H3 indicates such height at the surface of the meniscus lens 3 on the object side. Also, a surface angle means a tangential angle at a surface at a point where the above principal ray passes through.

TABLE 5

| | Example | | | | | | | | | |
|---|---|---|---|---|---|---|---|---|---|---|
| | 1 | 2 | 3 | 4 | 5 | 6 | 7 | 8 | 9 | 10 |
| Fno | 2.80 | 2.94 | 2.92 | 2.87 | 2.92 | 2.86 | 2.18 | 2.84 | 2.78 | 2.93 |
| Angle of Incidence | 32.00 | 32.00 | 26.00 | 32.00 | 32.00 | 32.00 | 32.00 | 32.00 | 32.00 | 26.00 |
| Angle of Emitting | 14.73 | 16.17 | 13.71 | 4.96 | 13.51 | 15.47 | 11.23 | 14.00 | 14.00 | 14.05 |
| Focal Length f | 2.04 | 2.12 | 2.65 | 2.06 | 2.11 | 2.06 | 2.05 | 2.69 | 2.04 | 2.63 |
| f1 | 0.70 | 1.01 | 2.28 | 1.13 | 1.48 | 1.26 | 1.19 | 1.46 | 1.03 | 1.53 |
| f2 | −2.17 | −2.00 | 8.99 | 4.32 | 3.09 | 2.00 | 78.69 | −7.58 | −5.83 | −11.88 |
| f1/f | 0.35 | 0.48 | 0.86 | 0.55 | 0.70 | 0.61 | 0.58 | 0.54 | 0.51 | 0.58 |
| Total Length T | 3.89 | 4.00 | 4.50 | 4.50 | 4.04 | 3.69 | 4.30 | 5.20 | 4.10 | 4.48 |
| T/f | 1.91 | 1.89 | 1.70 | 2.18 | 1.91 | 1.80 | 2.10 | 1.94 | 2.01 | 1.70 |
| R2/R1 | 0.13 | 0.24 | 0.44 | 0.27 | 0.38 | 0.33 | 0.32 | 0.27 | 0.16 | 0.30 |
| R3/R2 | 0.77 | 0.78 | 0.50 | 0.74 | 0.59 | 0.57 | 0.64 | 0.60 | 0.52 | 0.61 |
| Height of Principal Ray H2 | 0.46 | 0.65 | 0.31 | 0.82 | 0.78 | 0.64 | 0.75 | 0.82 | 0.58 | 0.38 |
| Height of Principal Ray H3 | 0.47 | 0.65 | 0.36 | 0.82 | 0.82 | 0.67 | 0.76 | 0.83 | 0.58 | 0.40 |
| H3/H2 | 1.01 | 1.01 | 1.14 | 1.00 | 1.05 | 1.06 | 1.01 | 1.01 | 1.01 | 1.05 |
| Surface Angle φ2 | 38.34 | 43.58 | 12.77 | 40.56 | 38.57 | 38.92 | 38.01 | 42.52 | 35.26 | 25.31 |
| Surface Angle φ3 | 43.81 | 43.76 | 28.32 | 46.91 | 39.54 | 49.14 | 44.66 | 51.73 | 42.93 | 38.07 |
| Φ2/3 | 0.88 | 1.00 | 0.45 | 0.86 | 0.98 | 0.79 | 0.85 | 0.82 | 0.82 | 0.66 |

The present invention realizes a low-cost image-pick up lens system of a small size, which is short in the total length, wherein the angle of field is beyond 30°, and the angle of incidence onto the image pickup device is small.

The entire disclosure of Japanese Patent Application No. 2002-136254 filed May 10, 2002 is incorporated by reference.

The invention claimed is:

1. An image-pick up lens comprising:
from a side of an object:
an aperture stop;
a biconvex positive lens; and
a meniscus lens having a concave surface on the object side,
wherein, when each of the lenses has at least one aspheric surface; and 'f indicates a focal length of all systems, 'f1' indicates a focal length of the positive lens, and 'T' indicates a length from the aperture stop to an image-pick up surface:

$0.3 < f1/f < 0.9$ and $T/f < 2.4$; and wherein, when at least one of the positive lens and the meniscus lens is aspheric on both surfaces and R1 indicates a curvature radius of the positive lens on the object side, R2 indicates a curvature radius of the positive lens on a side of an image, and R3 indicates a curvature radius of the meniscus lens on the object side:

$$0 < R2/R1 < 0.5 \text{ and } 0.4 < R3/R2 < 1.0.$$

2. An image-pick up lens comprising: from a side of an object:

an aperture stop;

a biconvex positive lens; and a meniscus lens having a concave surface on the object side, wherein, when each of the lenses has at least one aspheric surface; and 'f' indicates a focal length of all systems, 'f1' indicates a focal length of the positive lens, and 'T' indicates a length from the aperture stop to an image-pick up surface:

$$0.3 < f1/f < 0.9 \text{ and } T/f < 2.4; \text{ and}$$

wherein, when u1 stands for dispersion of the positive lens, and u2 for dispersion of the meniscus lens: u1>50 and u2<40.

* * * * *